(12) United States Patent
Zeng et al.

(10) Patent No.: US 11,375,299 B2
(45) Date of Patent: Jun. 28, 2022

(54) OPTICAL NETWORK POWER CONSERVATION

(71) Applicant: Huawei Technologies Co., Ltd., Shenzhen (CN)

(72) Inventors: Huaiyu Zeng, Red Bank, NJ (US); Xiang Liu, Marlboro, NJ (US); Andy Shen, Morganville, NJ (US); Ning Cheng, Basking Ridge, NJ (US); Yuanqiu Luo, Cranbury, NJ (US); Frank Effenberger, Frisco, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/156,319

(22) Filed: Jan. 22, 2021

(65) Prior Publication Data

US 2021/0144457 A1    May 13, 2021

Related U.S. Application Data

(63) Continuation of application No. PCT/CN2019/090962, filed on Jun. 12, 2019.
(Continued)

(51) Int. Cl.
*H04Q 11/00* (2006.01)

(52) U.S. Cl.
CPC ..... *H04Q 11/0067* (2013.01); *H04Q 11/0005* (2013.01); *H04Q 2011/0049* (2013.01); *H04Q 2011/0088* (2013.01)

(58) Field of Classification Search
CPC .......... H04Q 11/0067; H04Q 11/0005; H04Q 2011/0088; H04Q 2011/0049
See application file for complete search history.

(56) References Cited

U.S. PATENT DOCUMENTS

| 2008/0089685 A1 | 4/2008 | Kazawa et al. |
| 2009/0162053 A1 | 6/2009 | Ikeda et al. |

(Continued)

FOREIGN PATENT DOCUMENTS

| CN | 101162941 A | 4/2008 |
| CN | 101465696 A | 6/2009 |

(Continued)

OTHER PUBLICATIONS

"10-Gigabit-capable passive optical networks (XG-PON): Transmission convergence (TC) layer specification," Series G: Transmission Systems and Media, Digital Systems and Networks Digital sections and digital line system—Optical line systems for local and access networks, ITU-T G.987.3, Mar. 1, 2014, 146 pages.

*Primary Examiner* — Dzung D Tran
(74) *Attorney, Agent, or Firm* — Conley Rose, P.C.

(57) ABSTRACT

An OLT comprises a processor configured to: obtain optical powers associated with ONUs, and generate an instruction instructing a transmit order of transmissions based on the optical powers; a transmitter coupled to the processor and configured to transmit the instruction to the ONUs; and a receiver coupled to the processor and configured to receive the transmissions from the ONUs based on the instruction. An apparatus comprises a receiver configured to receive an instruction instructing a transmit order of transmissions based on optical powers associated with ONUs; a processor coupled to the receiver and configured to process the instruction; and a transmitter coupled to the processor and configured to transmit a transmission based on the instruction.

20 Claims, 9 Drawing Sheets

Related U.S. Application Data

(60) Provisional application No. 62/740,766, filed on Oct. 3, 2018.

(56) References Cited

U.S. PATENT DOCUMENTS

| | | | |
|---|---|---|---|
| 2010/0316380 A1* | 12/2010 | de Lind van Wijngaarden | H04Q 11/0066 398/58 |
| 2011/0200328 A1 | 8/2011 | In De Betou et al. | |
| 2011/0255866 A1 | 10/2011 | Van Veen et al. | |
| 2012/0039602 A1 | 2/2012 | Hood | |
| 2012/0045202 A1* | 2/2012 | Jiang | H04B 10/40 398/38 |
| 2013/0004172 A1 | 1/2013 | Sugawa et al. | |
| 2013/0064539 A1* | 3/2013 | Hood | H04Q 11/0067 398/9 |
| 2014/0233950 A1* | 8/2014 | Luo | H04Q 11/0067 398/66 |
| 2015/0365172 A1 | 12/2015 | Luo et al. | |
| 2019/0181952 A1* | 6/2019 | Jia | H04B 10/2589 |
| 2020/0044747 A1* | 2/2020 | Zhang | H04B 10/272 |

FOREIGN PATENT DOCUMENTS

| | | |
|---|---|---|
| CN | 102845005 A | 12/2012 |
| CN | 102857317 A | 1/2013 |
| EP | 3247129 A1 | 11/2017 |

\* cited by examiner

OPTICAL NETWORK POWER CONSERVATION

CROSS-REFERENCE TO RELATED APPLICATIONS

This is a continuation of Int'l Patent App. No. PCT/CN2019/090962 filed on Jun. 12, 2019, which claims priority to U.S. Prov. Patent App. No. 62/740,766 filed on Oct. 3, 2018, both of which are incorporated by reference.

TECHNICAL FIELD

The disclosed embodiments relate to optical networks in general and power conservation in optical networks in particular.

BACKGROUND

Optical networks are networks that use light waves, or optical signals, to carry data. Light sources such as lasers and LEDs generate optical signals; modulators modulate the optical signals with data to generate modulated optical signals; and various components transmit, propagate, amplify, receive, and process the modulated optical signals. Optical networks implement WDM and other forms of multiplexing to achieve high bandwidths. Optical networks implement data centers, metropolitan networks, PONs, long-hauls, and other applications.

SUMMARY

In an embodiment, an OLT comprises: a processor configured to: obtain optical powers associated with ONUs, and generate an instruction instructing a transmit order of transmissions based on the optical powers; a transmitter coupled to the processor and configured to transmit the instruction to the ONUs; and a receiver coupled to the processor and configured to receive the transmissions from the ONUs based on the instruction.

In any of the preceding embodiments, the OLT comprises an APD configured to measure the optical powers from bursts from the ONUs during prior messaging.

In any of the preceding embodiments, the instruction is a super burst schedule in a header of a downstream PHY frame, and wherein the super burst schedule instructs the ONUs when to transmit.

In any of the preceding embodiments, the transmissions are upstream optical bursts.

In any of the preceding embodiments, the transmit order is further based on a monotonic order of the optical powers.

In any of the preceding embodiments, the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the third ONU to transmit last within the super burst, and the second ONU to transmit between the first ONU and the third ONU within the super burst.

In any of the preceding embodiments, the transmit order is further based on a pyramidal order of the optical powers.

In any of the preceding embodiments, the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the second ONU to transmit last within the super burst, and the third ONU to transmit between the first ONU and the second ONU.

In any of the preceding embodiments, the transmit order is further based on a DC offset.

In any of the preceding embodiments, the transmit order is further based on a DC wander.

In any of the preceding embodiments, the instruction further instructs the transmissions to be in a substantially continuous manner in a super burst.

In any of the preceding embodiments, the OLT is configured to enter a sleep mode during an idle period following the transmissions in the super burst.

In an embodiment, a method is implemented by an OLT, the method comprises: obtaining optical powers associated with ONUs; generating an instruction instructing a transmit order of transmissions based on the optical powers; transmitting the instruction to the ONUs; and receiving the transmissions from the ONUs based on the instruction.

In any of the preceding embodiments, the method further comprises measuring the optical powers from bursts from the ONUs during prior messaging.

In any of the preceding embodiments, the instruction is a super burst schedule in a header of a downstream PHY frame, and wherein the super burst schedule instructs the ONUs when to transmit.

In any of the preceding embodiments, the transmissions are upstream optical bursts.

In any of the preceding embodiments, the transmit order is further based on a monotonic order of the optical powers.

In any of the preceding embodiments, the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the third ONU to transmit last within the super burst, and the second ONU to transmit between the first ONU and the third ONU within the super burst.

In any of the preceding embodiments, the transmit order is further based on a pyramidal order of the optical powers.

In any of the preceding embodiments, the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the second ONU to transmit last within the super burst, and the third ONU to transmit between the first ONU and the second ONU.

In any of the preceding embodiments, the transmit order is further based on a DC offset.

In any of the preceding embodiments, the transmit order is further based on a DC wander.

In any of the preceding embodiments, the instruction further instructs the transmissions to be in a substantially continuous manner in a super burst.

In any of the preceding embodiments, the method further comprises entering a sleep mode during an idle period following the transmissions in the super burst.

In an embodiment, a computer program product comprises computer executable commands stored on a non-transitory medium that when executed by a processor cause an OLT to: obtain optical powers associated with ONUs; generate an instruction instructing a transmit order of transmissions based on the optical powers; transmit the instruction to the ONUs; and receive the transmissions from the ONUs based on the instruction.

In any of the preceding embodiments, the commands further cause the OLT to measure the optical powers from bursts from the ONUs during prior messaging.

In any of the preceding embodiments, the instruction is a super burst schedule in a header of a downstream PHY frame, and wherein the super burst schedule instructs the ONUs when to transmit.

In any of the preceding embodiments, the transmissions are upstream optical bursts.

In any of the preceding embodiments, the transmit order is further based on a monotonic order of the optical powers.

In any of the preceding embodiments, the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the third ONU to transmit last within the super burst, and the second ONU to transmit between the first ONU and the third ONU within the super burst.

In any of the preceding embodiments, the transmit order is further based on a pyramidal order of the optical powers.

In any of the preceding embodiments, the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the second ONU to transmit last within the super burst, and the third ONU to transmit between the first ONU and the second ONU.

In any of the preceding embodiments, the transmit order is further based on a DC offset.

In any of the preceding embodiments, the transmit order is further based on a DC wander.

In any of the preceding embodiments, the instruction further instructs the transmissions to be in a substantially continuous manner in a super burst.

In any of the preceding embodiments, the commands further cause the OLT to enter a sleep mode during an idle period following the transmissions in the super burst.

In an embodiment, an apparatus comprises: a receiver configured to receive an instruction instructing a transmit order of transmissions based on optical powers associated with ONUs; a processor coupled to the receiver and configured to process the instruction; and a transmitter coupled to the processor and configured to transmit a transmission based on the instruction.

In any of the preceding embodiments, the apparatus is one of the ONUs, wherein the optical powers are of bursts from the ONUs during prior messaging.

In any of the preceding embodiments, the instruction is a super burst schedule in a header of a downstream PHY frame, and wherein the super burst schedule instructs the ONUs when to transmit.

In any of the preceding embodiments, the transmissions are upstream optical bursts.

In any of the preceding embodiments, the transmit order is further based on a monotonic order of the optical powers.

In any of the preceding embodiments, the ONUs comprise a first ONU associated with a lowest optical power, a third ONU associated with a highest optical power, and a second ONU associated with an optical power between the lowest optical power and the highest optical power, wherein the transmit order is for the first ONU to transmit first within a super burst, the third ONU to transmit last within the super burst, and the second ONU to transmit between the first ONU and the third ONU within the super burst, and wherein the apparatus is the first ONU, the second ONU, or the third ONU.

In any of the preceding embodiments, the transmit order is further based on a pyramidal order of the optical powers.

In any of the preceding embodiments, the ONUs comprise a first ONU associated with a lowest optical power, a third ONU associated with a highest optical power, and a second ONU associated with an optical power between the lowest optical power and the highest optical power, wherein the transmit order is for the first ONU to transmit first within a super burst, the second ONU to transmit last within the super burst, and the third ONU to transmit between the first ONU and the second ONU, and wherein the apparatus is the first ONU, the second ONU, or the third ONU.

In any of the preceding embodiments, the transmit order is further based on a DC offset.

In any of the preceding embodiments, the transmit order is further based on a DC wander.

In any of the preceding embodiments, the instruction further instructs the transmissions to be in a substantially continuous manner in a super burst.

In an embodiment, a method comprises: receiving an instruction instructing a transmit order of transmissions based on optical powers associated with ONUs; processing the instruction; and transmitting a transmission based on the instruction.

In any of the preceding embodiments, one of the ONUs implements the method, wherein the optical powers are of bursts from the ONUs during prior messaging.

In any of the preceding embodiments, the instruction is a super burst schedule in a header of a downstream PHY frame, and wherein the super burst schedule instructs the ONUs when to transmit.

In any of the preceding embodiments, the transmissions are upstream optical bursts.

In any of the preceding embodiments, the transmit order is further based on a monotonic order of the optical powers.

In any of the preceding embodiments, the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the third ONU to transmit last within the super burst, and the second ONU to transmit between the first ONU and the third ONU within the super burst.

In any of the preceding embodiments, the transmit order is further based on a pyramidal order of the optical powers.

In any of the preceding embodiments, the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the second ONU to transmit last within the super burst, and the third ONU to transmit between the first ONU and the second ONU.

In any of the preceding embodiments, the transmit order is further based on a DC offset.

In any of the preceding embodiments, the transmit order is further based on a DC wander.

In any of the preceding embodiments, the instruction further instructs the transmissions to be in a substantially continuous manner in a super burst.

In an embodiment, a computer program product comprises computer executable commands stored on a non-transitory medium that when executed by a processor cause an apparatus to: receive an instruction instructing a transmit order of transmissions based on optical powers associated with ONUs; process the instruction; and transmit a transmission based on the instruction.

In any of the preceding embodiments, the apparatus is one of the ONUs, wherein the optical powers are of bursts from the ONUs during prior messaging.

In any of the preceding embodiments, the instruction is a super burst schedule in a header of a downstream PHY frame, and wherein the super burst schedule instructs the ONUs when to transmit.

In any of the preceding embodiments, the transmissions are upstream optical bursts.

In any of the preceding embodiments, the transmit order is further based on a monotonic order of the optical powers.

In any of the preceding embodiments, the ONUs comprise a first ONU associated with a lowest optical power, a third ONU associated with a highest optical power, and a second ONU associated with an optical power between the lowest optical power and the highest optical power, wherein the transmit order is for the first ONU to transmit first within a super burst, the third ONU to transmit last within the super burst, and the second ONU to transmit between the first ONU and the third ONU within the super burst, and wherein the apparatus is the first ONU, the second ONU, or the third ONU.

In any of the preceding embodiments, the transmit order is further based on a pyramidal order of the optical powers.

In any of the preceding embodiments, the ONUs comprise a first ONU associated with a lowest optical power, a third ONU associated with a highest optical power, and a second ONU associated with an optical power between the lowest optical power and the highest optical power, wherein the transmit order is for the first ONU to transmit first within a super burst, the second ONU to transmit last within the super burst, and the third ONU to transmit between the first ONU and the second ONU, and wherein the apparatus is the first ONU, the second ONU, or the third ONU.

In any of the preceding embodiments, the transmit order is further based on a DC offset.

In any of the preceding embodiments, the transmit order is further based on a DC wander.

In any of the preceding embodiments, the instruction further instructs the transmissions to be in a substantially continuous manner in a super burst.

In an embodiment, an OLT comprises: a receiver comprising: a SerDes TX; a DSP coupled to the SerDes TX; an ADC coupled to the DSP; and a TIA and AGC coupled to the ADC, wherein the OLT is configured to enter a sleep mode during an idle period of an upstream frame such that at least one of the SerDes TX, the DSP, the ADC, or the TIA and AGC powers off or goes to sleep.

In an embodiment, an OLT comprises: a transmitter comprising: a SerDes RX; a DSP coupled to the SerDes RX; an DAC coupled to the DSP; and a LD coupled to the DAC, wherein the OLT is configured to enter a sleep mode during an idle period of a downstream frame such that at least one of the SerDes RX, the DSP, the DAC, or the LD powers off, goes to sleep, or reduces its functionality.

In any of the preceding embodiments, at least one of a bias, an output power, or cooling of the LD reduces during the idle period.

In any of the preceding embodiments, at least one of the DSP, the DAC, or the LD powers off or goes to sleep during the idle period.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
AC: alternating current
ADC: analog-to-digital converter
AGC: automatic gain control
APD: avalanche photodiode
ASIC: application-specific integrated circuit
CDR: clock and data recovery
CO: central office
CPU: central processing unit
DAC: digital-to-analog converter
dB: decibel(s)
DC: direct current
DML: directly modulated laser
DSP: digital signal processor
EO: electrical-to-optical
FPGA: field-programmable gate array ITU-T: International Telecommunication Union Telecommunication Standardization Sector
LD: line driver
LED: light-emitting diode
MAC: media access control
ns: nanosecond(s)
ODN: optical distribution network
OE: optical-to-electrical
OLT: optical line terminal
ONT: optical network terminal
ONU: optical network unit
NRZ: non-return-to-zero
PAM-4: 4-level pulse-amplitude modulation
PHY: physical layer
PON: passive optical network
P2MP: point-to-multipoint
RAM: random-access memory
RF: radio frequency
ROM: read-only memory
RX: receiver, receiver unit
SerDes: serializer/deserializer
SRAM: static RAM
TCAM: ternary content-addressable memory
TDMA: time-division multiple access
TEC: thermoelectric cooler
TIA: transimpedance amplifier
TX: transmitter, transmitter unit
WDM: wavelength-division multiplexing
XG-PON: 10-gigabit-capable PON
10 G: 10 gigabits per second
50 G: 50 gigabits per second
µs: microsecond(s).

Figure 1:
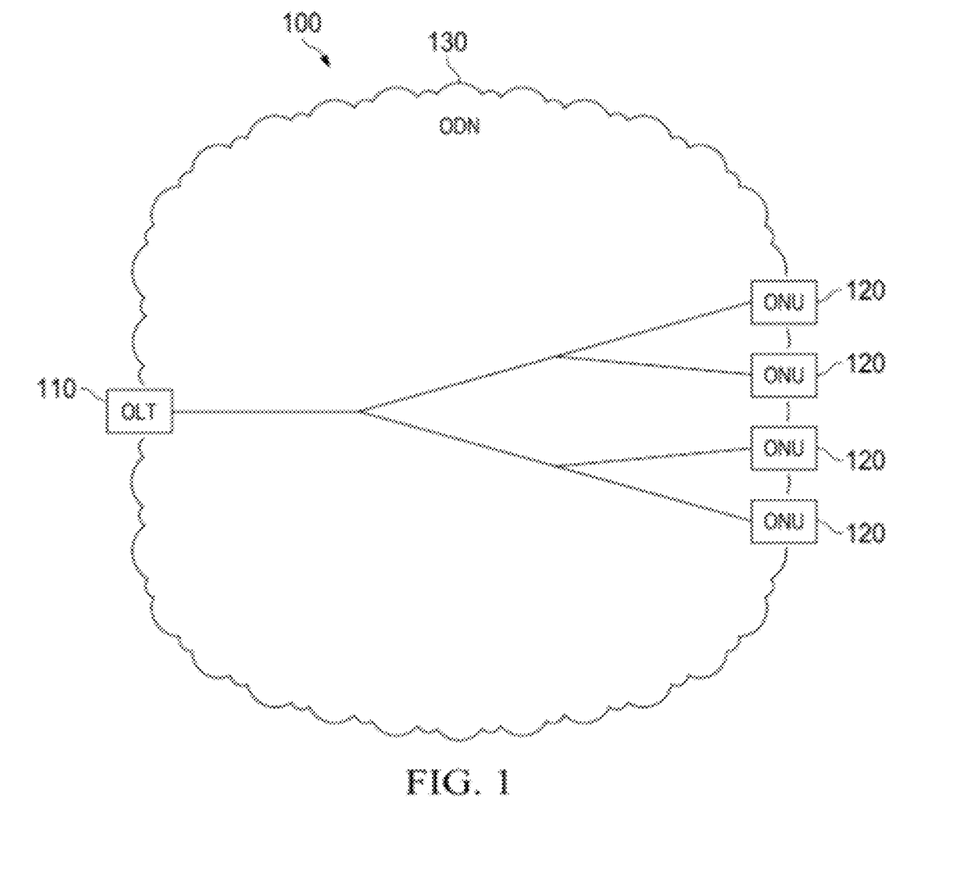
FIG. 1 is a schematic diagram of a PON.

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with another network and the ONUs 120. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute signals between the OLT 110 and the ONUs 120. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transceivers that receive optical signals from the OLT 110, convert the optical signals into electrical signals, and provide the electrical signals to the customers. The transceivers also receive electrical signals from the customers, convert the electrical signals into optical signals, and transmit the optical signals to the OLT 110. ONUs 120 and ONTs are similar, and the terms may be used interchangeably. The ONUs 120 are typically located at distributed locations such as customer premises, but they may also be located at other suitable locations.

ITU-T G.987.3—Series G: Transmission Systems and Media, Digital Systems, and Networks, January 2014, standardizes XG-PONs, which offer 10 G data rates. In addition, the ITU-T is currently developing a standard for 50 G data rates. However, both the OLT and the ONUs in 50 G PONs will consume more power than they do in 10 G PONs. That is particularly true for the OLT because the OLT receiver remains powered on. While some approaches provide for ONU power conservation, there remains a need to provide OLT power conservation.

Disclosed herein are embodiments for optical network power conservation. An OLT minimizes downstream transmission periods and upstream transmission periods and thus maximizes idle periods, then enters a sleep mode during the idle periods. For upstream bursts from ONUs to the OLT, the OLT schedules ONU bursts to be in a substantially continuous manner with minimal guard times between them, and the OLT orders the ONU bursts based on optical powers. For downstream bursts from the OLT to the ONUs, the OLT schedules OLT bursts to be in a substantially continuous manner with minimal guard times between them. Bursts may also be referred to as optical bursts or optical signal bursts. Though OLTs in PONs are discussed, the same principles apply to any service provider endpoints in optical networks.

Figure 2:
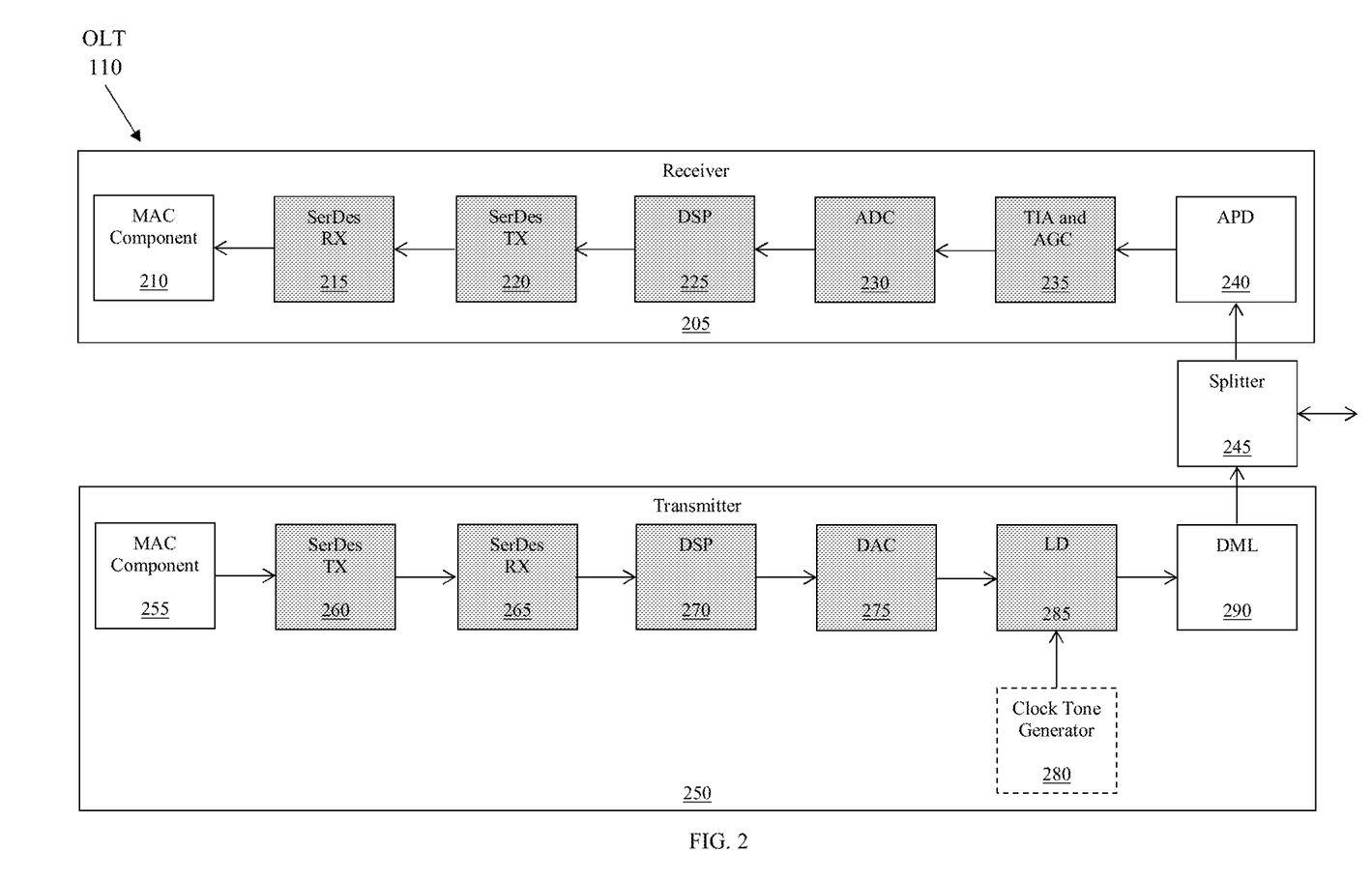
FIG. 2 is a schematic diagram of the OLT in FIG. 1 according to an embodiment of the disclosure.

FIG. 2 is a schematic diagram of the OLT 110 in FIG. 1 according to an embodiment of the disclosure. The OLT 110 generally comprises a receiver 205, a splitter 245, and a transmitter 250. The receiver 205 comprises a MAC component 210, a SerDes RX 215, a SerDes TX 220, a DSP 225, an ADC 230, a TIA and AGC 235, and an APD 240. The transmitter 250 comprises a MAC component 255, a SerDes TX 260, a SerDes RX 265, a DSP 270, a DAC 275, an LD 285, and a DML 290. The transmitter 250 optionally comprises a clock tone generator 280.

In an upstream direction, the splitter 245 receives an upstream optical signal from the ONUs 120 in a TDMA manner. The APD 240 converts the upstream optical signal into an electrical signal. The TIA and AGC 235 amplifies and maintains an amplitude of the electrical signal to create an amplified electrical signal. The ADC 230 converts the amplified electrical signal from an analog signal to a digital signal. The DSP 225 performs physical layer clock and data recovery to obtain a bit stream and passes the bit stream to the MAC component 210 through the SerDes TX 220 and the SerDes RX 215. Finally, the MAC component 210 performs MAC layer processing of the bit stream to create Ethernet packets and transmits the Ethernet packets to a core network.

In a downstream direction, the MAC component 255 receives Ethernet packets from the core network, forms a PHY frame from the Ethernet packets, and passes the PHY frame to the DSP 270 through the SerDes TX 260 and the SerDes RX 265. The DSP 270 converts the PHY frame to a modulated signal using, for instance, NRZ or PAM-4. The DAC 275 converts the modulated signal into an analog signal. The LD 285 amplifies the analog signal to create an amplified analog signal. The DML 290 creates a downstream optical signal by modulating an optical signal with the amplified analog signal. Finally, the splitter 245 transmits the downstream optical signal to one or more of the ONUs 120. When the clock tone generator 280 is present, it is a hardware component and generates a clock tone for timing downstream bursts to the ONUs 120. When the clock tone generator 280 is not present, the DSP 270 generates the clock tone.

Figure 3A:
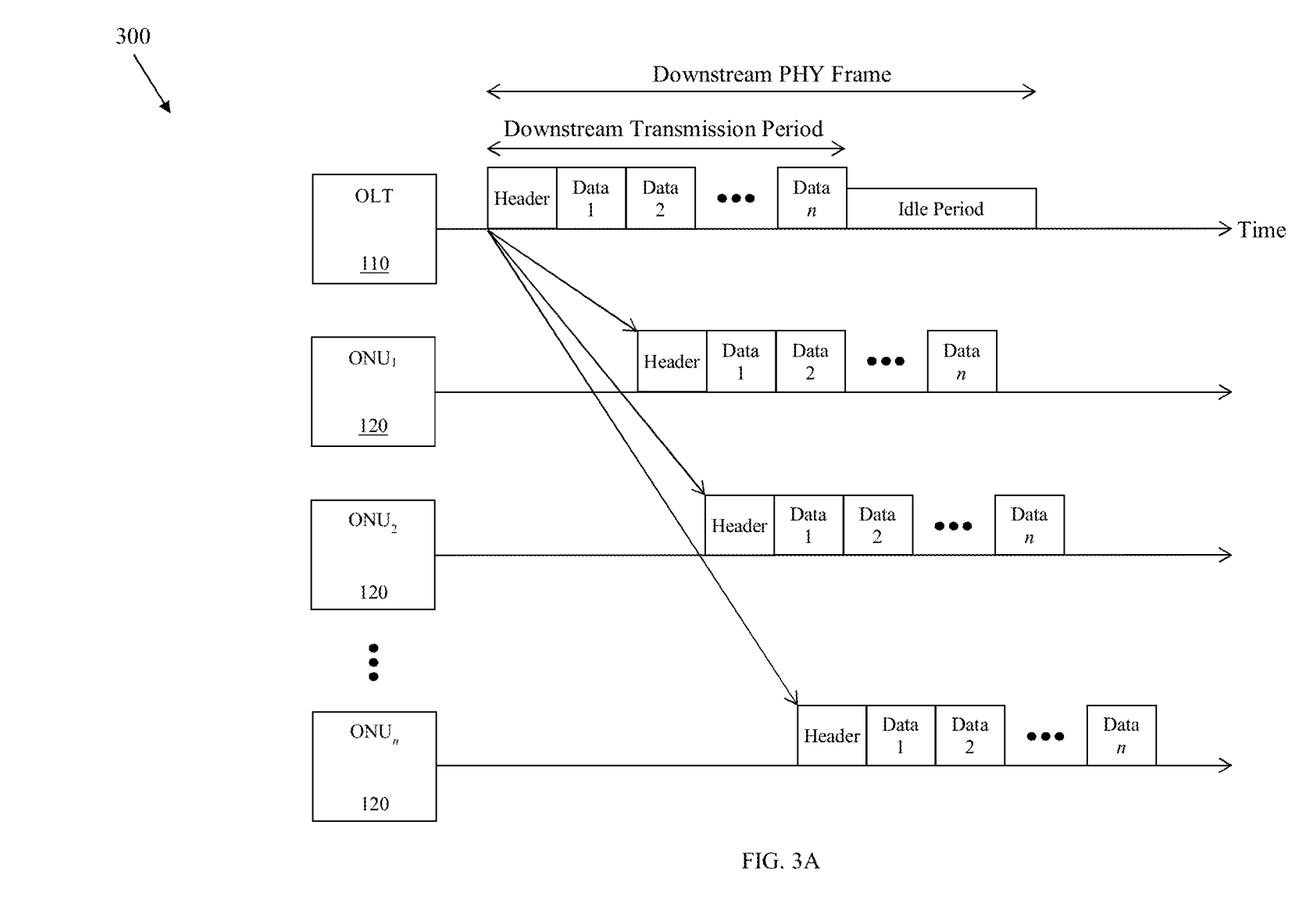
FIG. 3A is a message sequence diagram for downstream OLT transmission according to an embodiment of the disclosure.

FIG. 3A is a message sequence diagram 300 for downstream OLT transmission according to an embodiment of the disclosure. In the message sequence diagram 300, the OLT 110 transmits a header and data 1-n to n ONUs 120 during a downstream transmission period. n is a positive integer. The header instructs the ONUs 120 with a time to start transmitting bursts, a length of time of the bursts, and a modulation format of the bursts. In order to assist the OLT 110 in tracking ONU 120 burst timing, the header may instruct the ONUs 120 to transmit bursts even when they do not have user data to transmit. The data are any suitable data corresponding to their respective ONUs 120. After the downstream transmission period, the OLT 110 enters an idle period. During the idle period, the OLT 110 does not transmit headers or other data to the ONUs 120. A combination of the downstream transmission period and its corresponding idle period makes up a downstream PHY frame. The downstream PHY frame may be about 125 µs.

Figure 3B:
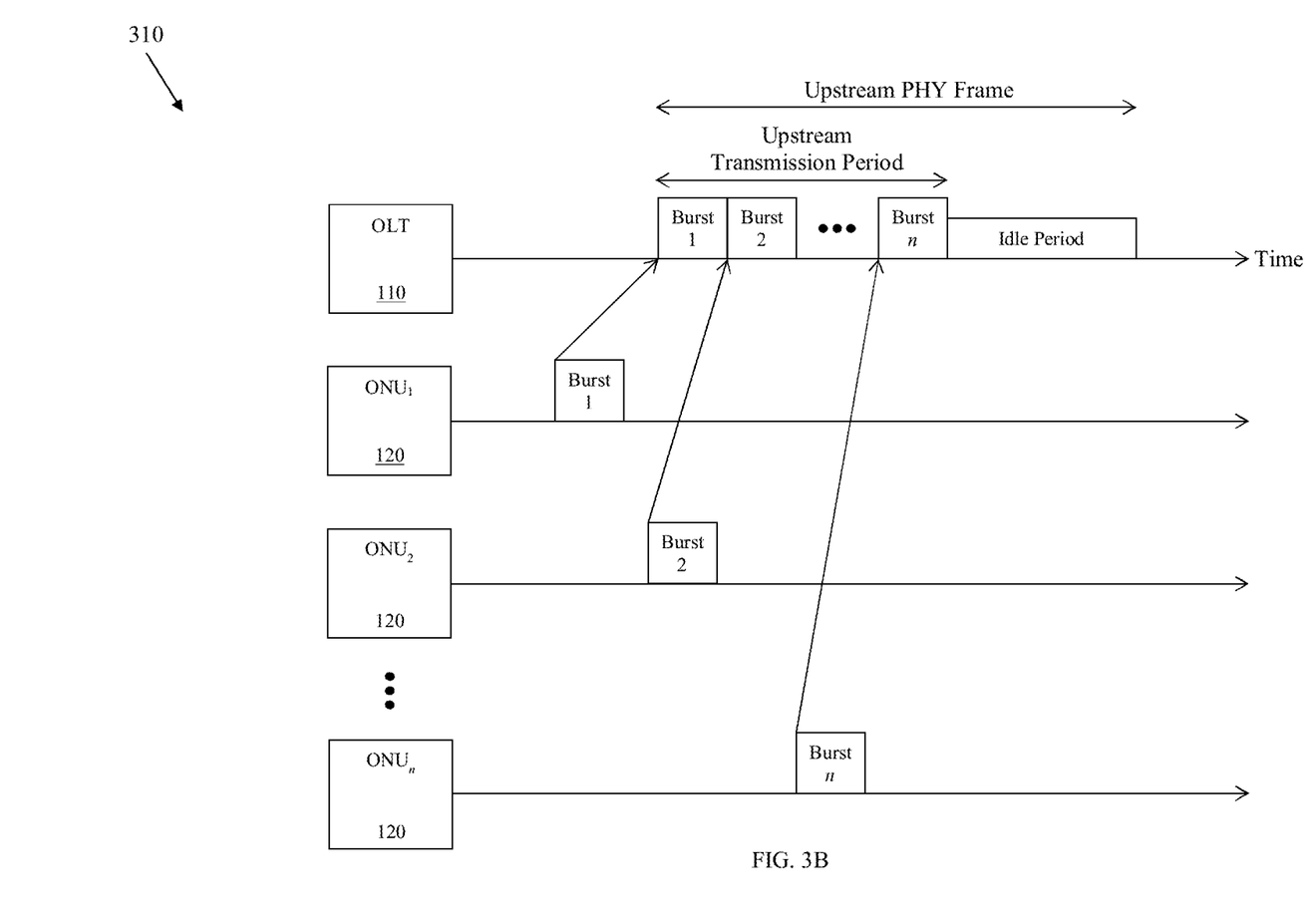
FIG. 3B is a message sequence diagram for upstream OLT reception according to an embodiment of the disclosure.

FIG. 3B is a message sequence diagram 310 for upstream OLT reception according to an embodiment of the disclosure. In the message sequence diagram 310 and in response to the header in the message sequence diagram 300 in FIG. 3A, the ONU$_1$ 120 transmits burst 1 to the OLT 110, then the ONU$_2$ 120 transmits burst 2 to the OLT 110, and so on until the ONU$_n$ transmits burst n to the OLT 110, all during an upstream transmission period. A combination of bursts 1-n is referred to as a super burst. The ONUs 120 may send additional super bursts. Bursts are separated by guard times in order to reduce interference between the bursts. Super bursts are separated by super guard times in order to reduce interference between the super bursts. After the upstream transmission period, the OLT 110 enters an idle period. During the idle period, the OLT 110 does not receive bursts from the ONUs 120. A combination of the upstream transmission period and its corresponding idle period makes up an upstream PHY frame. The upstream PHY frame may be about 125 µs.

Figure 4:
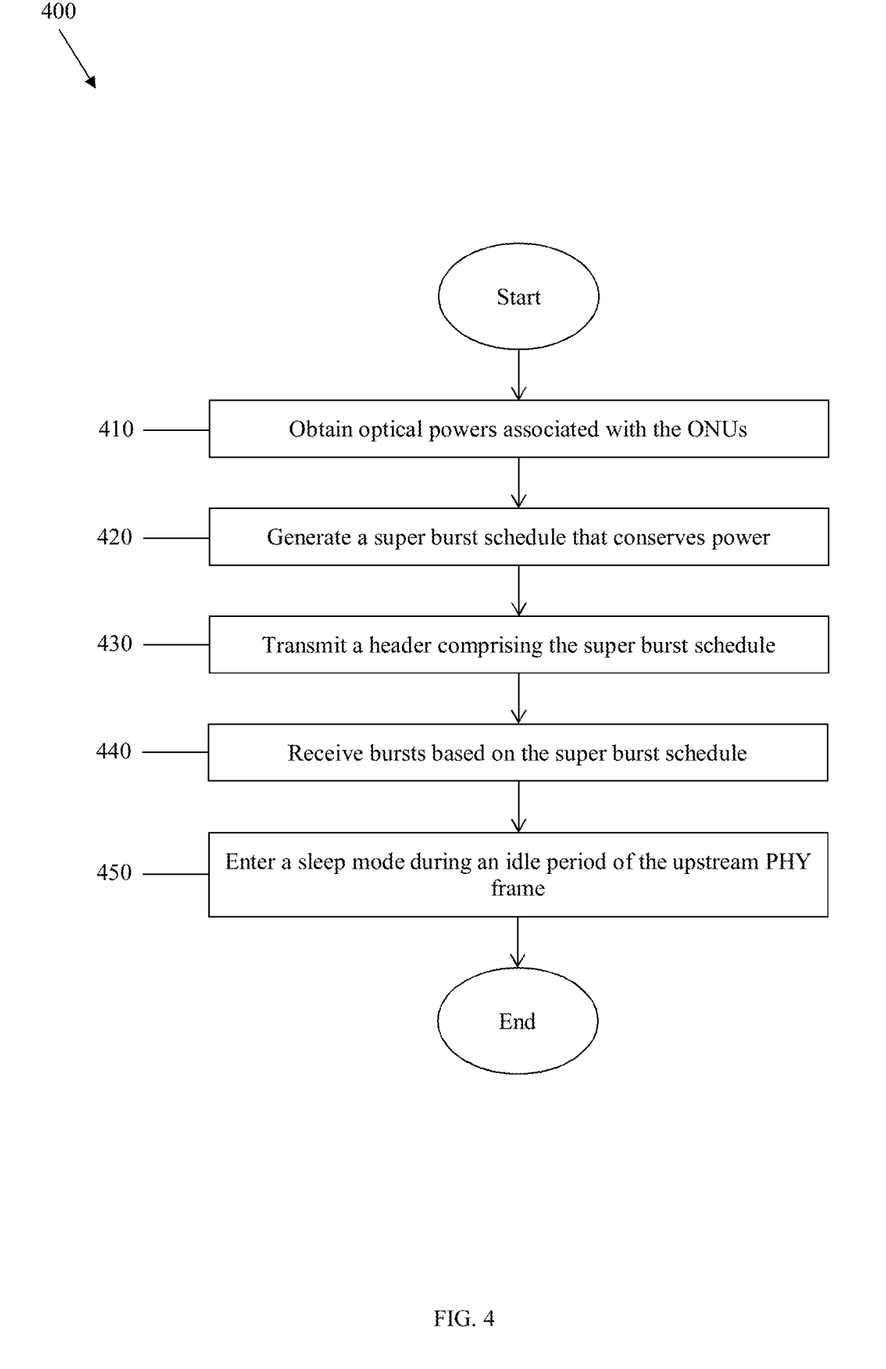
FIG. 4 is a flowchart illustrating a method of optical network power conservation according to an embodiment of the disclosure.

FIG. 4 is a flowchart illustrating a method 400 of optical network power conservation according to an embodiment of the disclosure. The OLT 110 implements the method 400. At step 410, the OLT 110 obtains optical powers associated with the ONUs 120. For instance, the APD 240 measures the optical powers of bursts from the ONUs 120 during prior messaging. The prior messaging may be during a ranging period. As an example, the OLT 110 receives from an ONU$_1$ 120 burst 1 with optical power $P_1$, receives from an ONU$_2$ 120 burst 2 with optical power $P_2$, receives from an ONU$_3$ 120 burst 3 with optical power $P_3$, receives from an ONU$_4$ 120 burst 4 with optical power $P_4$, and receives from an ONU$_5$ 120 burst 5 with optical power $P_5$, where $P_1 < P_2 < P_3 < P_4 < P_5$.

At step 420, the OLT 110 generates a super burst schedule that conserves power. The super burst schedule is for upstream bursts from the ONUs 120 to the OLT 110. The super burst schedule conserves power by minimizing lengths of upstream transmission periods in upstream PHY frames, and thus maximizing lengths of idle periods in upstream PHY frames, in at least three ways. First, the super burst schedule has the ONUs 120 transmit bursts in a substantially continuous manner. For instance, the ONUs 120 transmit bursts as a super burst without an idle period. Second, the super burst schedule minimizes guard times between the bursts while ensuring the guard times are sufficient to prevent interference between the bursts. Third, the super burst schedule orders bursts based on $P_1$-$P_5$ and instructs guard times and super guard times in order to minimize both DC offset and DC wander based on the principles below.

The ONUs 120 transmit bursts as series of logical 0s and 1s, where a laser off period represents a logical 0 and a laser on period represents a logical 1. A DC offset is a mean displacement from zero. For instance, if an ONU 120 transmits the same number of 0s and 1s over a period of time, then a DC offset for that period is 0.5. The OLT 110 sets a threshold to determine whether it is receiving a 0 or a 1, so when a DC offset is 0.5, the OLT 110 may set the threshold to 0.5. The ONUs 120 have different DC offsets, so the OLT 110 changes the threshold for each ONU 120. The difference between the DC offsets is a DC wander. Larger DC offsets and DC wanders reduce OLT 110 reception speed.

$V_{1,offset}$, a maximum DC offset associated with a first burst in a super burst, is as follows:

$$V_{1,offset} = V_1 e^{(-T_p/\tau)} \quad (1)$$

$$V_1 \geq P_{first} \quad (2)$$

$V_1$ is a voltage associated with the first burst, $T_p$ is a length of a preamble that is a known sequence used for training of the receiver 205, $\tau$ is an AC coupling time constant, and $P_{first}$ is an average optical power of the first burst. As can be seen, a lower $P_{first}$ yields a lower $V_1$, which yields a lower $V_{1,offset}$. Thus, because $P_1$ is the lowest from among $P_1$-$P_5$, the super burst schedule orders subsequent bursts from the ONU$_1$ 120 to be first in each super burst.

$V_{2,offset}$, a maximum DC offset associated with a second burst in the super burst, is as follows:

$$V_{2,offset} = [V_2 - V_1 e^{(-T_g/\tau)}] e^{(-T_p/\tau)} \quad (3)$$

$$V_2 \propto P_{second} \quad (4)$$

$V_2$ is a voltage associated with the second burst, $V_1$ is described above, $T_g$ is a guard time between the first burst and the second burst, $\tau$ is described above, and $P_{second}$ is an average optical power of the second burst. As can be seen in equation (3), when $V_2$ and $V_1$ are similar and when $T_g$ is minimized, the first bracketed expression is minimized, which yields a lower $V_{2,offset}$. As can be seen by comparing relationship (2) and relationship (4), $V_2$ and $V_1$ are similar when $P_{first}$ and $P_{second}$ are similar. Thus, because $P_2$ is the closest to $P_1$ from among $P_1$-$P_5$, the super burst schedule orders subsequent bursts from the ONU$_2$ 120 to be second in each super burst and the super burst schedule minimizes guard times between subsequent bursts from the ONU$_1$ 120 and subsequent bursts from the ONU$_2$ 120.

Given the principles above, in a first embodiment, the super burst schedule orders subsequent bursts based on the following order of $P_1$-$P_5$:

$$P_1 \rightarrow P_2 \rightarrow P_3 \rightarrow P_4 \rightarrow P_5 \quad (5)$$

As shown, the lowest optical power is first, the second-lowest optical power is second, the median optical power is third, the second-highest optical power is fourth, and the highest optical power is fifth so that the optical powers are in an ascending order. Thus, the ONUs 120 respectively corresponding to $P_1$-$P_5$ transmit bursts in the same transmit order as follows:

$$ONU_1\ 120 \rightarrow ONU_2\ 120 \rightarrow ONU_3\ 120 \rightarrow ONU_4\ 120 \rightarrow ONU_5\ 120 \qquad (6)$$

In addition, the super burst schedule minimizes guard times between bursts without introducing interference between the bursts or without introducing an amount of interference between the bursts that exceeds a threshold. For instance, the guard times are about 100 ns to about 1 µs. However, the relatively larger optical power associated with the $ONU_5$ 120 may cause a relatively large DC wander, so the super burst schedule may increase a super guard time to, for instance, about 500 ns. The ascending order of the optical powers reduces a DC offset, which reduces the DC wander. The order (5) may be generalized to n optical powers $P_1$-$P_n$ in an ascending order, and the transmit order (6) may be generalized to n ONUs 120 respectively corresponding to $P_1$-$P_n$ and transmitting bursts in the same order. Alternatively, the order (5) may be generalized to n optical powers $P_1$-$P_n$ in a descending order, and the transmit order (6) may be generalized to n ONUs 120 respectively corresponding to $P_1$-$P_n$ and transmitting bursts in the same order. A monotonic order may refer to both the ascending order and the descending order.

Alternatively, in a second embodiment, the super burst schedule orders subsequent bursts from the ONUs based on the following order of $P_1$-$P_5$:

$$P_1 \rightarrow P_3 \rightarrow P_5 \rightarrow P_4 \rightarrow P_2 \qquad (7)$$

As shown, the lowest optical power and the second-lowest optical power are on the ends, the highest optical power is in the middle, and the remaining optical powers are in between the ends and the middle so that the optical powers are in a pyramidal order. Thus, the ONUs 120 respectively corresponding to $P_1$-$P_5$ transmit bursts in the same transmit order as follows:

$$ONU_1\ 120 \rightarrow ONU_3\ 120 \rightarrow ONU_5\ 120 \rightarrow ONU_4\ 120 \rightarrow ONU_2\ 120 \qquad (8)$$

In addition, the super burst schedule decreases super guard times compared to the first embodiment because differences between optical powers of adjacent super bursts are less than in the first embodiment. The order (7) may be generalized to n optical powers $P_1$-$P_n$ in a pyramidal order, and the transmit order (8) may be generalized to n ONUs 120 respectively corresponding to $P_1$-$P_n$ and transmitting bursts in the same order.

Comparing the first embodiment to the second embodiment, as an example, if n=64, then a maximum difference among $P_1$-$P_{64}$ is about 15 dB. Thus, a difference between optical powers of adjacent super bursts can be as high as 15 dB in the first embodiment and as low as 0.5 dB in the second embodiment. Because the DC offset decays with time exponentially, the super guard time in the first embodiment may need to be 30 times as large as in the second embodiment, so if a 100 ns super guard time is sufficient for the second embodiment, then a 3 µs guard time may be needed for the first embodiment.

At step 430, the OLT 110 transmits a header comprising the super burst schedule. The header is in a downstream PHY frame. Alternatively, the super burst schedule is in the form of any instruction from the OLT 110 to the ONUs 120. The OLT 110 transmits the header to all of the ONUs 120.

At step 440, the OLT 110 receives bursts based on the super burst schedule. Thus, in the first embodiment, the OLT 110 receives a first burst from the $ONU_1$ 120, then receives a second burst from the $ONU_2$ 120, then receives a third burst from the $ONU_3$ 120, then receives a fourth burst from the $ONU_4$ 120, and then receives a fifth burst from the $ONU_5$ 120. In the second embodiment, the OLT 110 receives a first burst from the $ONU_1$ 120, then receives a second burst from the $ONU_3$ 120, then receives a third burst from the $ONU_5$ 120, then receives a fourth burst from the $ONU_4$ 120, and then receives a fifth burst from the $ONU_2$ 120.

Finally, at step 450, the OLT 110 enters a sleep mode during an idle period of the upstream PHY frame. During the sleep mode, the SerDes RX 215, the SerDes TX 220, the DSP 225, the ADC 230, and the TIA and AGC 235 power off or go to sleep. Alternatively, during the sleep mode, a subset of the SerDes RX 215, the SerDes TX 220, the DSP 225, the ADC 230, and the TIA and AGC 235 powers off or goes to sleep. When components of the OLT 110 enter a sleep mode, the OLT 110 may connect remaining components in any suitable manner. In the sleep mode, the components may keep essential sub-components powered on. For instance, the DSP 225 may keep a clock powered on. The OLT 110 may repeat at least steps 420 and 430 of the method 400 based on a schedule, a triggering event such as one of the ONUs 120 exiting the PON 100 or a new ONU entering the PON 100, or another reason.

Figure 5:
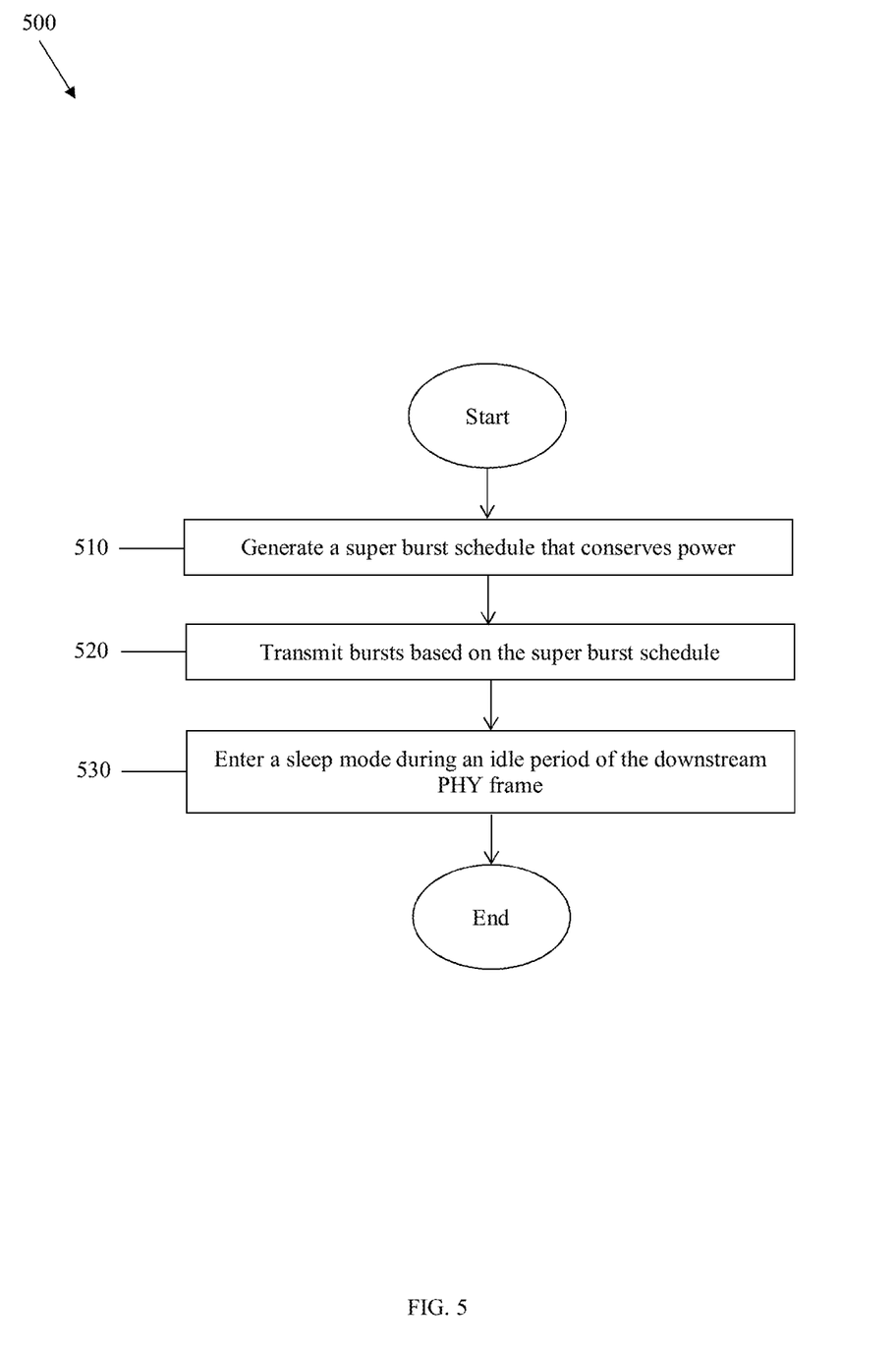
FIG. 5 is a flowchart illustrating a method of optical network power conservation according to another embodiment of the disclosure.

FIG. 5 is a flowchart illustrating a method 500 of optical network power conservation according to another embodiment of the disclosure. The OLT 110 implements the method 500. The method 500 is similar to the method 400. However, instead of a super burst schedule for upstream PHY frames for transmissions from the ONUs 120 to the OLT 110, the method 500 is for downstream PHY frames for transmissions from the OLT 110 to the ONUs 120.

At step 510, the OLT 110 generates a super burst schedule that conserves power. The super burst schedule is for downstream bursts from the OLT 110 to the ONUs 120. The super burst schedule conserves power by minimizing lengths of downstream transmission periods in downstream PHY frames, and thus maximizing lengths of idle periods in downstream PHY frames, in at least two ways. First, the super burst schedule has the OLT 110 transmit bursts in a substantially continuous manner. For instance, the OLT 110 transmits bursts to the ONUs 120 as a super burst without an idle period. Second, the super burst schedule minimizes guard times between the bursts while ensuring the guard times are sufficient to prevent interference between the bursts. At step 520, the OLT 110 transmits bursts based on the super burst schedule.

Finally, at step 530, the OLT 110 enters a sleep mode during an idle period of the downstream PHY frame. During the sleep mode, the SerDes TX 260, the SerDes RX 265, the DSP 270, the DAC 275, and the LD 285 power off, go to sleep, or reduce their functionality in at least one of three ways. In a first embodiment, a bias and an output power of the LD 285 are reduced. Because the output power reduces, a TEC of the LD 285 reduces its cooling. In a second embodiment, the DSP 270 and the DAC 275 power off or go to sleep. Instead of the DSP 270, the clock tone generator 280 generates a clock tone. In a third embodiment, the DSP 270, the DAC 275, and the LD 285 power off or go to sleep. In that case, the ONUs 120 comprise burst-mode receiver DSPs that can perform burst-mode CDR, and the downstream PHY frame may reduce in size from about 125 µs to about 62.5 µs. When components of the OLT 110 enter a sleep mode, the OLT 110 may connect remaining components in any suitable manner. The OLT 110 may repeat at least step 510 of the method 500 based on a schedule, a triggering event such as one of the ONUs 120 exiting the PON 100 or a new ONU entering the PON 100, or another reason.

By extending the idle period and entering a sleep mode during the idle period in both the method 400 and the method 500, the OLT 110 conserves power. Though five ONUs 120 are discussed, the same principles apply to fewer or more ONUs 120. When there is an even number of ONUs 120, the two highest optical powers are in the middle of the transmit order (7) so that the two ONUs 120 associated with those optical powers transmit bursts in the middle of super bursts. Though bursts from the OLT 110 to the ONUs 120 and from the ONUs 120 to the OLT 110 are discussed, the bursts may be any suitable transmissions.

Figure 6:
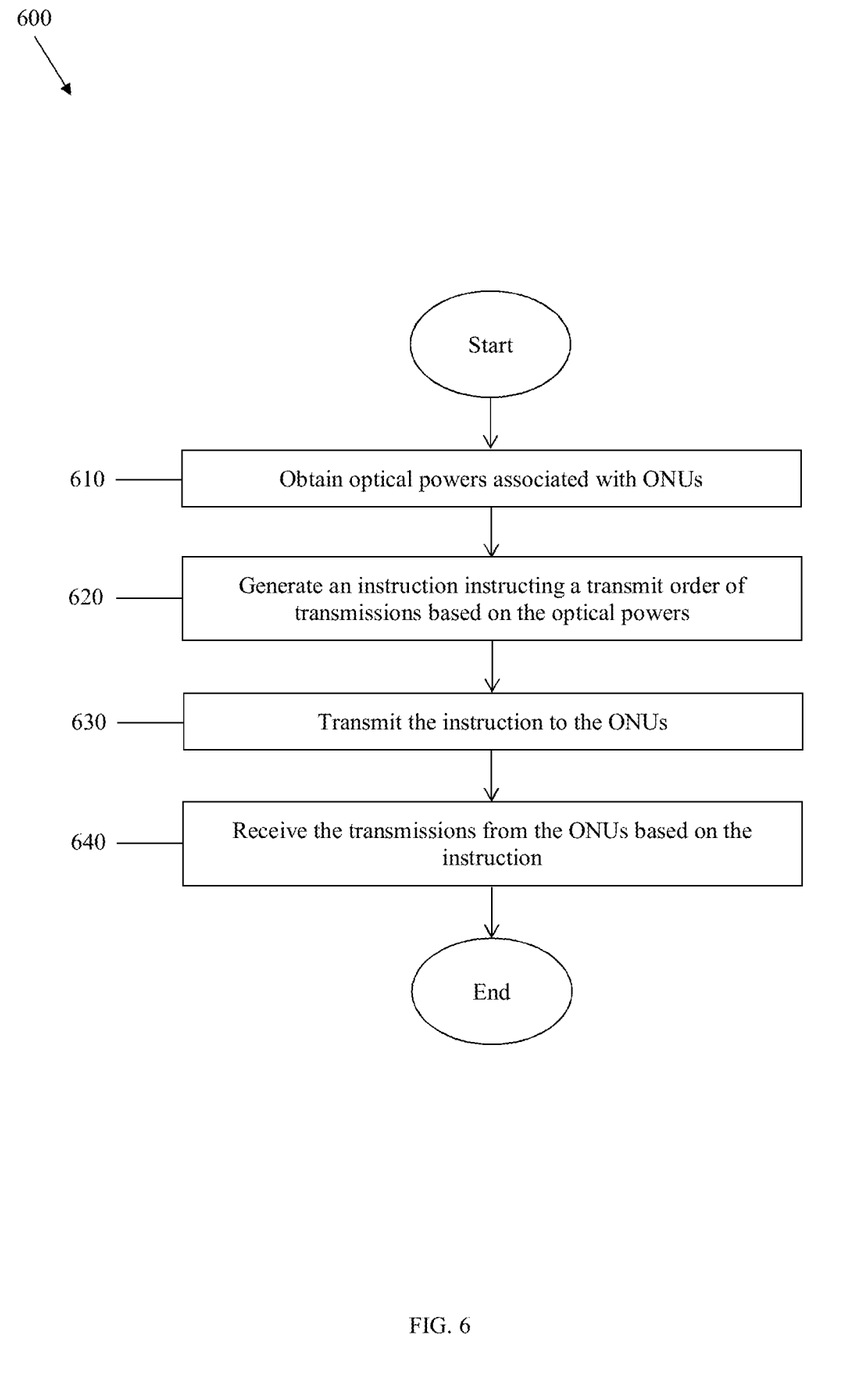
FIG. 6 is a flowchart illustrating a method of optical network power conservation according to yet another embodiment of the disclosure.

FIG. 6 is a flowchart illustrating a method 600 of optical network power conservation according to yet another embodiment of the disclosure. The OLT 110 may perform the method 600. At step 610, optical powers associated with ONUs are obtained. For instance, the OLT 110 obtains the optical powers as described at step 410 of the method 400. At step 620, an instruction instructing a transmit order of transmissions based on the optical powers is generated. For instance, the OLT 110 generates the super burst schedule as described at step 420 of the method 400. At step 630, the instruction is transmitted to the ONUs. For instance, the OLT 110 transmits the header comprising the super burst schedule as described at step 430 of the method 400. Finally, at step 640, the transmissions from the ONU are received based on the instruction. For instance, the OLT 110 receives the bursts as described at step 440 of the method 400.

Figure 7:
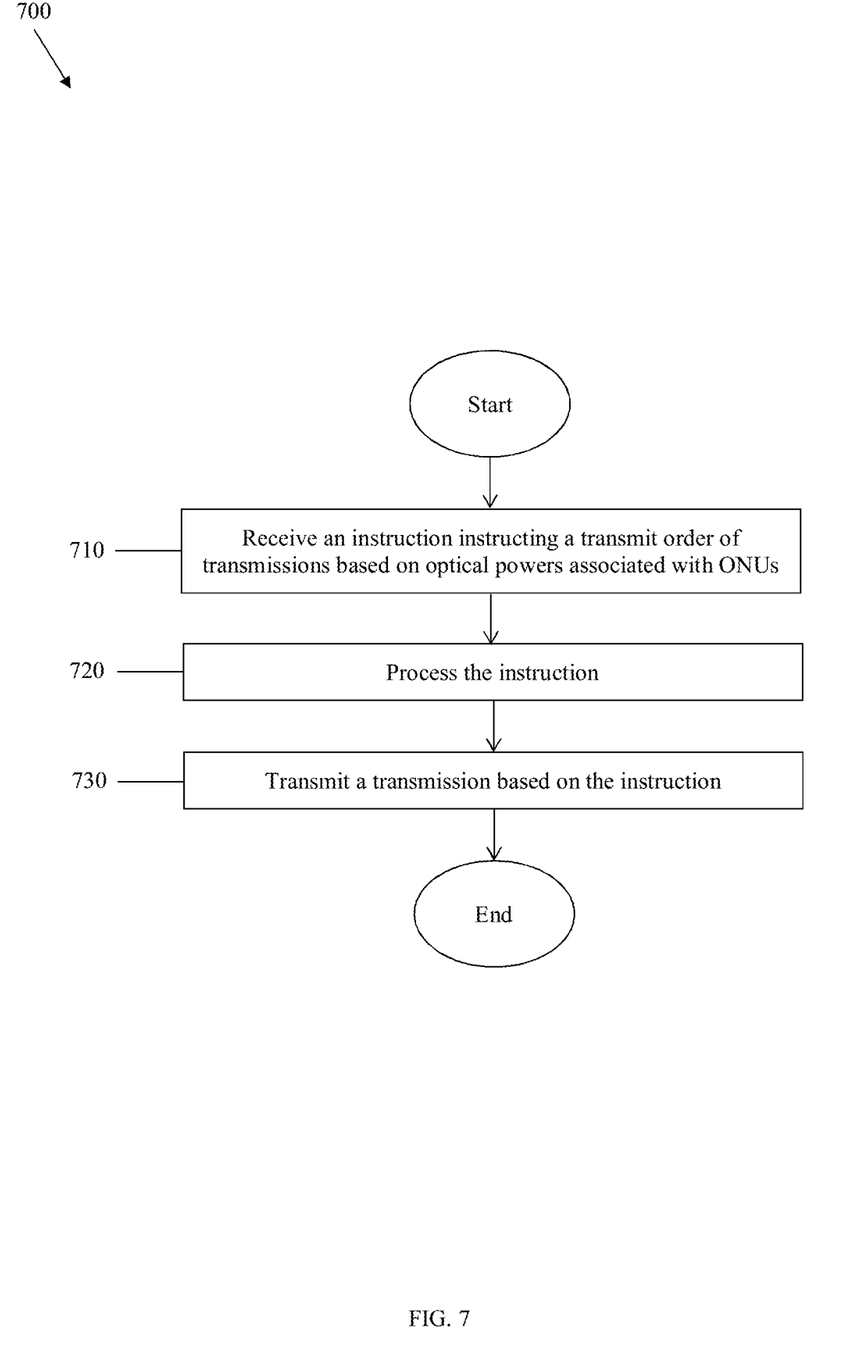
FIG. 7 is a flowchart illustrating a method of optical network power conservation according to yet another embodiment of the disclosure.

FIG. 7 is a flowchart illustrating a method 700 of optical network power conservation according to yet another embodiment of the disclosure. One of the ONUs 120 may perform the method 700. At step 710, an instruction instructing a transmit order of transmissions based on optical powers associated with ONUs is received. For instance, the ONU 120 receives the header described at step 430 in the method 400. At step 720, the instruction is processed. Finally, at step 730, a transmission is transmitted based on the instruction. For instance, the ONU 120 transmits one of the bursts described at step 440 in the method 400.

Figure 8:
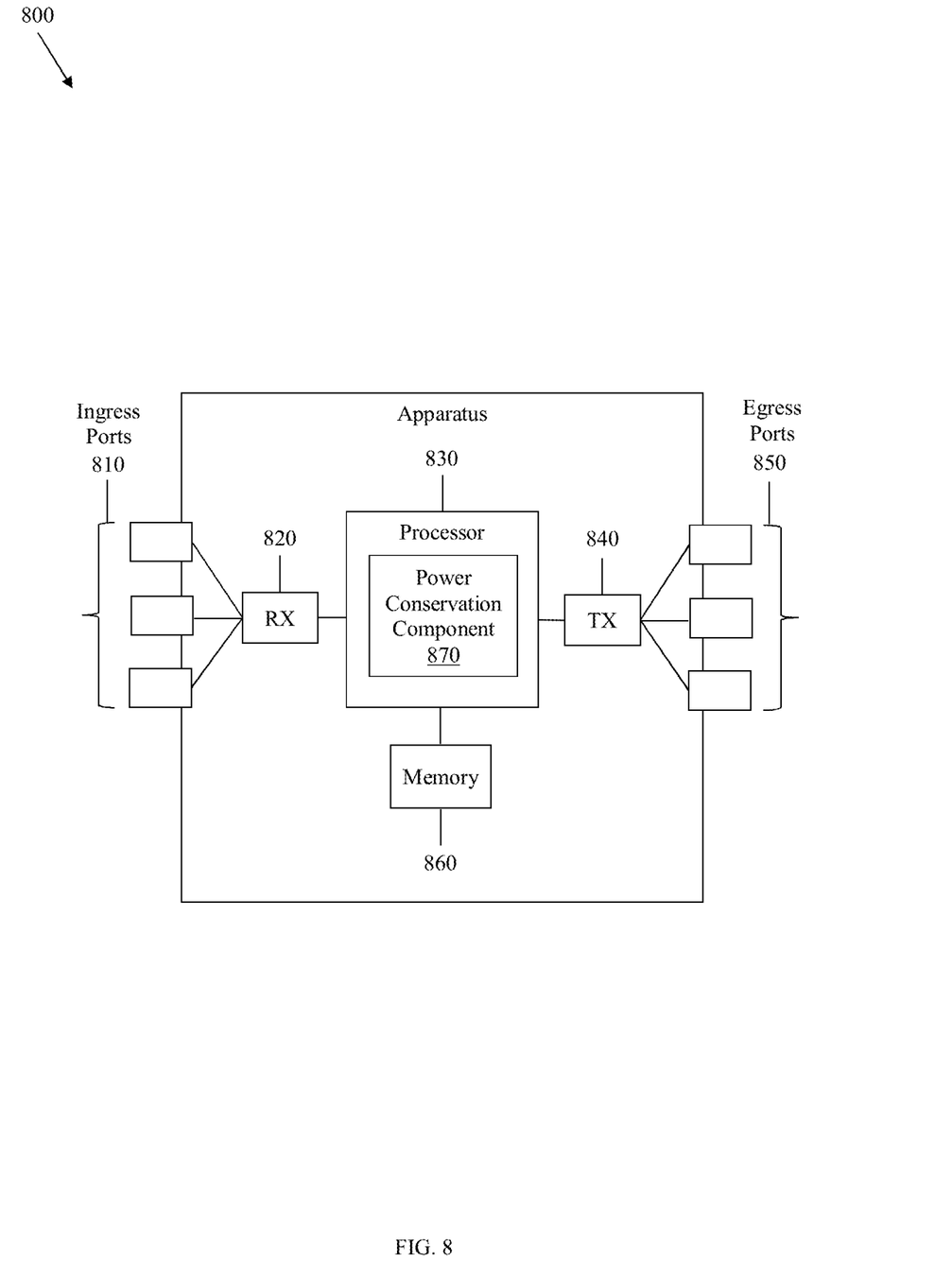
FIG. 8 is a schematic diagram of an apparatus according to an embodiment of the disclosure.

FIG. 8 is a schematic diagram of an apparatus 800 according to an embodiment of the disclosure. The apparatus 800 implements the disclosed embodiments. The apparatus 800 comprises ingress ports 810 and an RX 820 to receive data; a processor, logic unit, baseband unit, or CPU 830 to process the data; a TX 840 and egress ports 850 to transmit the data; and a memory 860 to store the data. The apparatus 800 may also comprise OE components, EO components, or RF components coupled to the ingress ports 810, the RX 820, the TX 840, and the egress ports 850 to provide ingress or egress of optical signals, electrical signals, or RF signals.

The processor 830 is any combination of hardware, middleware, firmware, or software. The processor 830 comprises any combination of one or more CPU chips, cores, FPGAs, ASICs, or DSPs. The processor 830 communicates with the ingress ports 810, the RX 820, the TX 840, the egress ports 850, and the memory 860. The processor 830 comprises a power conservation component or routine 870, which implements the disclosed embodiments. The inclusion of the power conservation component 870 therefore provides a substantial improvement to the functionality of the apparatus 800 and effects a transformation of the apparatus 800 to a different state. Alternatively, the memory 860 stores the power conservation component 870 as instructions, and the processor 830 executes those instructions.

The memory 860 comprises any combination of disks, tape drives, or solid-state drives. The apparatus 800 may use the memory 860 as an over-flow data storage device to store programs when the apparatus 800 selects those programs for execution and to store instructions, or commands, and data that the apparatus 800 reads during execution of those programs. The memory 860 may be volatile or non-volatile and may be any combination of ROM, RAM, TCAM, or SRAM.

An OLT comprises a processor element configured to: obtain optical powers associated with ONUs, and generate an instruction instructing a transmit order of transmissions based on the optical powers; a transmitter element coupled to the processor element and configured to transmit the instruction to the ONUs; and a receiver element coupled to the processor element and configured to receive the transmissions from the ONUs based on the instruction.

In an example embodiment, the apparatus 800 includes an optical power module obtaining optical powers associated with ONUs, an instruction module generating an instruction instructing a transmit order of transmissions based on the optical powers, a transmission module transmitting the instruction to the ONUs, and a reception module receiving the transmissions from the ONUs based on the instruction. In some embodiments, the apparatus 800 may include other or additional modules for performing any one of or combination of steps described in the embodiments. Further, any of the additional or alternative embodiments or aspects of the method, as shown in any of the figures or recited in any of the claims, are also contemplated to include similar modules.

In an example embodiment, the apparatus 800 includes an instruction reception module receiving an instruction instructing a transmit order of transmissions based on optical powers associated with ONUs, an instruction module processing the instruction, and a transmitter module transmitting a transmission based on the instruction. In some embodiments, the apparatus 800 may include other or additional modules for performing any one of or combination of steps described in the embodiments. Further, any of the additional or alternative embodiments or aspects of the method, as shown in any of the figures or recited in any of the claims, are also contemplated to include similar modules.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) comprising:
   a processor configured to:
   obtain optical powers associated with optical network units (ONUs), generate an instruction instructing a transmit order of transmissions based on the optical powers, determine an idle period of an upstream physical layer (PHY) frame or a downstream PHY frame, and cause the OLT to enter a sleep mode during the idle period;

a receiver coupled to the processor and configured to receive upstream bursts during a non-idle period; and a transmitter coupled to the processor and configured to transmit downstream bursts during the non-idle period.

2. The OLT of claim 1, further comprising an avalanche photodiode (APD) configured to measure the optical powers from bursts from the ONUS during prior messaging.

3. The OLT of claim 1, wherein the transmit order is further based on a monotonic order of the optical powers.

4. The OLT of claim 3, wherein the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the third ONU to transmit last within the super burst, and the second ONU to transmit between the first ONU and the third ONU within the super burst.

5. The OLT of claim 2claim 1, wherein the transmit order is further based on a pyramidal order of the optical powers.

6. The OLT of claim 5, wherein the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the second ONU to transmit last within the super burst, and the third ONU to transmit between the first ONU and the second ONU.

7. The OLT of claim 1, wherein the transmitter is further configured to transmit the instruction to the ONUs.

8. The OLT of claim 7, wherein the instruction is a super burst schedule in a header of a downstream physical layer (PHY) frame, and wherein the super burst schedule instructs the ONUs when to transmit.

9. The OLT of claim 1, wherein the receiver is further configured to receive the transmissions from the ONUs based on the instruction.

10. A method implemented by an optical line terminal (OLT) and comprising:

obtaining optical powers associated with optical network units (ONUs);

generating an instruction instructing a transmit order of transmissions based on the optical powers;

determining an idle period of an upstream physical layer (PHY) frame or a downstream PHY frame;

causing the OLT to enter a sleep mode during the idle period;

receiving upstream bursts during a non-idle period; and transmitting downstream bursts during the non-idle period.

11. The method of claim 10, wherein the transmit order is further based on a monotonic order of the optical powers.

12. The method of claim 11, wherein the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the third ONU to transmit last within the super burst, and the second ONU to transmit between the first ONU and the third ONU within the super burst.

13. The method of claim 10, wherein the transmit order is further based on a pyramidal order of the optical powers.

14. The method of claim 13, wherein the ONUs comprise a first ONU associated with a lowest optical power, a third ONU associated with a highest optical power, and a second ONU associated with an optical power between the lowest optical power and the highest optical power, and wherein the transmit order is for the first ONU to transmit first within a super burst, the second ONU to transmit last within the super burst, and the third ONU to transmit between the first ONU and the second ONU.

15. The method of claim 10, further comprising transmitting the instruction to the ONUs.

16. The method of claim 15, wherein the instruction is a super burst schedule in a header of a downstream physical layer (PHY) frame, and wherein the super burst schedule instructs the ONUs when to transmit.

17. The method of claim 10, further comprising receiving the transmissions from the ONUs based on the instruction.

18. A computer program product comprising instructions that are stored on a computer-readable medium and that, when executed by a processor, cause an optical line terminal (OLT) to:

obtain optical powers associated with optical network units (ONUs);

generate an instruction instructing a transmit order of transmissions based on the optical powers;

determine an idle period of an upstream physical layer (PHY) frame or a downstream PHY frame;

cause the OLT to enter a sleep mode during the idle period;

receive upstream bursts during a non-idle period; and transmit downstream bursts during the non-idle period.

19. The computer program product of claim 18, wherein the transmit order is further based on a monotonic order of the optical powers.

20. The computer program product of claim 18, wherein the transmit order is further based on a pyramidal order of the optical powers.

* * * * *

UNITED STATES PATENT AND TRADEMARK OFFICE
CERTIFICATE OF CORRECTION

PATENT NO. : 11,375,299 B2
APPLICATION NO. : 17/156319
DATED : June 28, 2022
INVENTOR(S) : Huaiyu Zeng et al.

Page 1 of 1

It is certified that error appears in the above-identified patent and that said Letters Patent is hereby corrected as shown below:

In the Claims

Column 15, Claim 5, Lines 25-26:
Delete "The OLT of claim2claim1, wherein the transmit order is further based on a pyramidal order of the optical powers."

And insert:
-- The OLT of claim 1, wherein the transmit order is further based on a pyramidal order of the optical powers. --

Signed and Sealed this
Twenty-third Day of August, 2022

Katherine Kelly Vidal
*Director of the United States Patent and Trademark Office*